United States Patent
Shao

(10) Patent No.: US 10,716,043 B2
(45) Date of Patent: Jul. 14, 2020

(54) ACCESS POINT HANDOVER METHOD AND DEVICE

(71) Applicant: ZTE CORPORATION, Shenzhen, Guangdong (CN)

(72) Inventor: Minru Shao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/088,961

(22) PCT Filed: May 23, 2016

(86) PCT No.: PCT/CN2016/083027
§ 371 (c)(1),
(2) Date: Sep. 27, 2018

(87) PCT Pub. No.: WO2016/197809
PCT Pub. Date: Dec. 15, 2016

(65) Prior Publication Data
US 2019/0150041 A1     May 16, 2019

(30) Foreign Application Priority Data
Mar. 30, 2016 (CN) .......................... 2016 1 0192987

(51) Int. Cl.
*H04W 36/08* (2009.01)
*H04W 36/00* (2009.01)

(52) U.S. Cl.
CPC ....... *H04W 36/08* (2013.01); *H04W 36/0016* (2013.01); *H04W 36/0061* (2013.01); *H04W 36/00837* (2018.08); *H04W 36/00835* (2018.08)

(58) Field of Classification Search
CPC .......... H04W 36/08; H04W 36/00837; H04W 36/0016
See application file for complete search history.

(56) References Cited

U.S. PATENT DOCUMENTS 8,027,312 B2    9/2011  Marinier et al.
9,713,045 B2 *  7/2017  Jones .............. H04W 36/00835
(Continued)

FOREIGN PATENT DOCUMENTS

CN    104853448 A    8/2015
CN    104902537 A    9/2015
(Continued)

OTHER PUBLICATIONS

International Search Report for International Appl. No. PCT/CN2016/083027, dated Dec. 23, 2016.
(Continued)

*Primary Examiner* — Fahmida S Chowdhury
(74) *Attorney, Agent, or Firm* — Foley & Lardner LLP

(57) ABSTRACT

The present disclosure provides an access point handover method and device. The method includes: determining a first access point (AP) set detected by a source AP where a station is located, where the first AP set includes at least one AP; selecting, from the first AP set and according to the first AP set and a pre-stored AP set, a target AP to which the station is to be handed over; and transmitting a handover message to the station. The handover message is used for instructing the station to be handed over from the source AP to the target AP.

14 Claims, 4 Drawing Sheets

(56) References Cited

U.S. PATENT DOCUMENTS

| | | | | |
|---|---|---|---|---|
| 2007/0232307 A1* | 10/2007 | Ibrahim | ............... | H04W 36/30 |
| | | | | 455/436 |
| 2007/0263575 A1* | 11/2007 | Choe | ................ | H04W 36/0066 |
| | | | | 370/338 |
| 2013/0301617 A1* | 11/2013 | Kuhn | ................ | H04W 36/0083 |
| | | | | 370/331 |
| 2015/0141015 A1* | 5/2015 | Zhang | ............... | H04W 36/0061 |
| | | | | 455/436 |
| 2016/0212666 A1* | 7/2016 | Zalzalah | .......... | H04W 36/0038 |
| 2016/0323786 A1* | 11/2016 | Syed | ................ | H04W 36/0061 |

FOREIGN PATENT DOCUMENTS

| | | |
|---|---|---|
| CN | 105357708 A | 2/2016 |
| WO | WO-2015/113305 A1 | 8/2015 |
| WO | WO-2015/184379 A2 | 12/2015 |

OTHER PUBLICATIONS

Extended European Search Report for EP Patent Application No. 16806707.2, dated Oct. 2, 2019.

\* cited by examiner

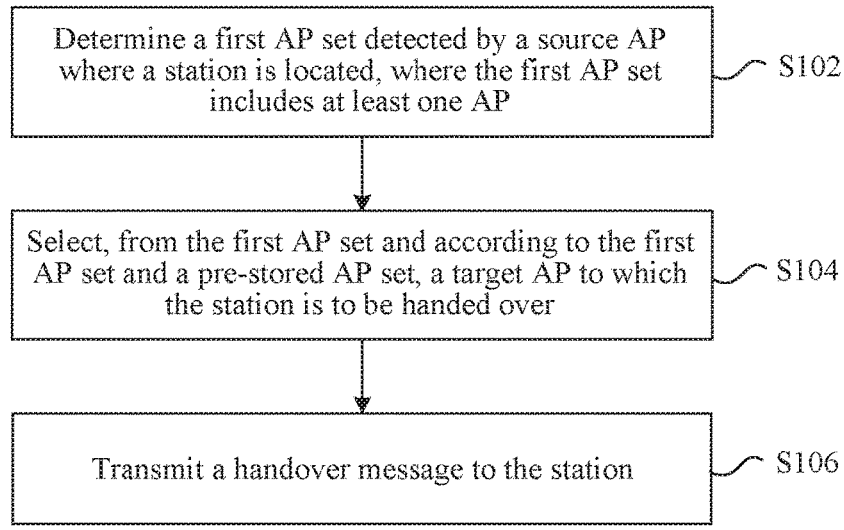
FIG. 1
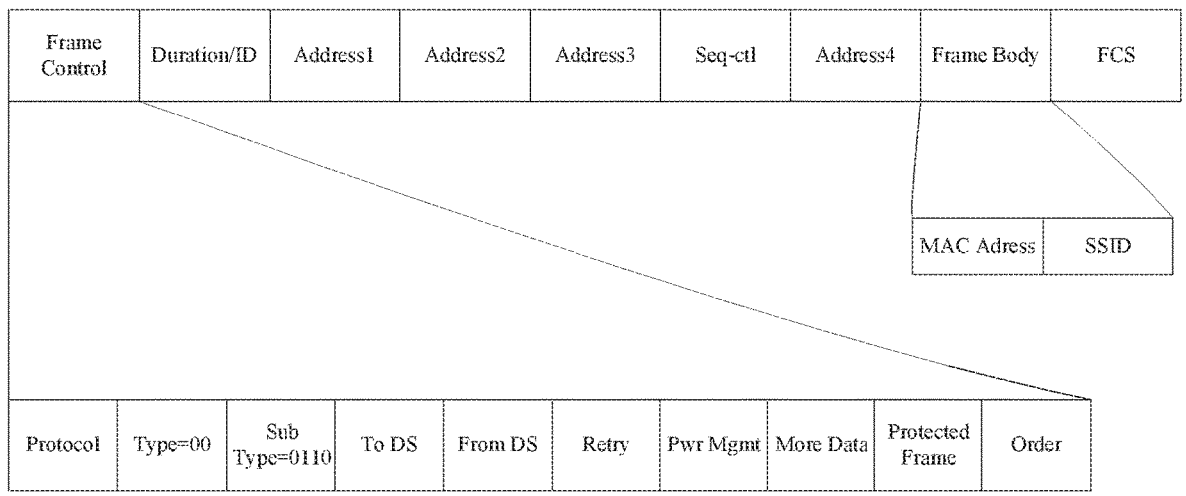
FIG. 2
FIG. 3

ACCESS POINT HANDOVER METHOD AND DEVICE

CROSS REFERENCE TO RELATED APPLICATIONS

This is a National Stage Application, filed under 35 U.S.C. 371, of International Patent Application No. PCT/CN2016/083027, filed on May 23, 2016, which claims priority to Chinese patent application No. 201610192987.0 filed on Mar. 30, 2016, contents of both of which are incorporated herein by reference in their entireties.

TECHNICAL FIELD

The present invention relates to, but is not limited to, the technical field of communications, and particularly relates to an access point switching method and device.

BACKGROUND

At present, when using a mobile terminal to access the Internet, users often use Wireless Fidelity (WIFI for short) for network connection. With the increasing popularity of the WIFI, accessing the Internet through the WIFI has become one of the mainstream Internet access methods. Moreover, most of mobile terminals currently have a function of providing a wireless local area network (WLAN for short) hotspot. When going out, people often carry the mobile hotspot and provide WIFI services for other mobile terminals such as mobile phones. When returning home or arriving at other specific locations, the users may need to disconnect the mobile terminal from the mobile hotspot and make the mobile terminal access more powerful WIFI hotspots.

In the related art, when a station (STA) is connected to a certain access point (AP), the STA will be disconnected from the AP when one of the following scenarios occur: 1, the strength of a WIFI signal drops to a certain threshold due to the increasing distance between the STA and this AP or other reasons; 2, when the AP is turned off or the WIFI signal is closed due to other reasons; 3, when the AP rejects the connection with the STA in some manner; and 4, when the user of the STA manually disconnects the STA from the AP.

According to the related art, when a certain STA establishes a connection with a specific AP, if the above several scenarios do not occur, the connection is always maintained. Even if the user moves to other high-quality hotspot coverage areas, the connection is not changed, and the access point will not be intelligently handed over.

In addition, the Chinese patent application with an application number of 201510358781.6 proposed the following solution. information of an AP currently accessed by the STA and information of an AP previously accessed by the STA are uploaded to a server, the server calculates the AP that the STA is most likely to access in the future according to a path of the STA and transmits the information of this AP to the STA. In this solution, when the access point handover is performed, a signal strength of the currently-accessed AP is forcibly reduced to a standard specified handover threshold at the STA, and the access point handover is implemented according to a standard handover procedure.

In view of the problem in the related art that a target access point to which the station is handed over cannot be selected according to a source access point, an effective solution has not been proposed yet.

SUMMARY

The following is an summary of a subject matter detailed in the present invention. This summary is not intended to limit a protective scope of claims.

The present invention provides an access point handover method and device, to at least solve a problem in the related art that a target access point to which a station is to be handed over cannot be selected according to a source access point.

According to an aspect of embodiments of the present invention, an access point handover method is provided. The method includes: determining a first access point (AP) set detected by a source AP where a station is located, where the first AP set includes at least one AP; selecting, from the first AP set and according to the first AP set and a pre-stored AP set, a target AP to which the station is to be handed over; and transmitting a handover message to the station. The handover message is configured to instruct the station to be handed over from the source AP to the target AP.

Alternatively, the selecting, from the first AP set and according to the first AP set and a pre-stored AP set, a target AP to which the station is to be handed over includes: searching the pre-stored AP set for APs each of which has a media access control (MAC) address identical to a MAC address of a respective one AP of the first AP set; and acquiring an AP corresponding to a preset connection priority from the found APs as the target AP.

Alternatively, the handover message carries a disconnection request, and the disconnection request is used for requesting the station to disconnect from the source AP.

Alternatively, after transmitting the handover message to the station, the method further includes: receiving a disconnection indication message transmitted by the station in response to the disconnection request; disconnecting the station from the source AP when the disconnection indication message indicates accepting the disconnection request; and maintaining a connection between the source AP and the station when the disconnection indication message indicates rejecting the disconnection request.

Alternatively, before transmitting the handover message to the station, the method further includes: setting a field content of a disconnection request data frame for carrying the disconnection request. The field content includes a field for indicating that a current request is the disconnection request and a field for indicating an identity of the target AP.

Alternatively, the transmitting the handover message to the station includes: determining whether a duration in which a data transmission rate between the source AP and the station is greater than a preset data transmission rate exceeds a preset duration or not; and transmitting the handover message to the station upon a determination that the duration in which the data transmission rate between the source AP and the station is greater than the preset data transmission rate is less than a preset duration.

Alternatively, after transmitting the handover message to the station, the method further includes: receiving the handover message by the station, and handing over the station from the source AP to the target AP according to an indication of the handover message.

According to another aspect of the embodiments of the present invention, an access point handover method is further provided. The method includes: receiving a handover message transmitted by a source access point (AP) where a station is located, and handing over the station from the source AP to a target AP. The handover message is configured to instruct the station to be handed over from the source AP to the target AP. The target AP is selected by the source AP from a first AP set according to the first AP set and a pre-stored AP set. The first AP set is detected by the source AP and includes at least one AP.

Alternatively, the handing over the station from the source AP to the target AP includes: determining whether the target AP is in a second AP set stored in the station; and in response to determining that the target AP is in the second AP set stored in the station, handing over the station from the source AP to the target AP.

Alternatively, the handover message carries a disconnection request, and the disconnection request is used for requesting the station to disconnect from the source AP.

Alternatively, after determining whether the target AP is in the second AP set stored in the station, the method further includes: in response to determining that the target AP is in the second AP set stored in the station, transmitting a disconnection indication message that indicates accepting the disconnection request to the source AP, and disconnecting the station from the source AP.

According to yet another aspect of the embodiments of the present invention, an access point handover device is further provided. The device includes a determination module, a selection module and a transmission module. The determination module is configured to determine a first access point (AP) set detected by a source AP where a station is located. The first AP set includes at least one AP. The selection module is configured to select, from the first AP set and according to the first AP set and a pre-stored AP set, a target AP to which the station is to be handed over. The transmission module is configured to transmit a handover message to the station. The handover message is used for instructing the station to be handed over from the source AP to the target AP.

According to further aspect of the embodiment of the present invention, an access point handover device is further provided. The device includes a first reception module, a determination module and a handover module. The first reception module is configured to receive a handover message transmitted by a source access point (AP) where a station is located. The handover message is configured to instruct the station to be handed over from the source AP to the target AP. The target AP is selected by the source AP from a first AP set according to the first AP set and a pre-stored AP set. The first AP set is detected by the source AP and includes at least one AP. The determination is configured to determine whether the target AP is in a second AP set that is stored in the station. The handover module is configured to, in response to determining that the target AP is in the second AP set stored by the station, hand over the station from the source AP to the target AP.

Embodiments of the present invention further provide a computer readable storage medium storing computer executable instructions that implement the above methods when being executed by a processor.

According to the embodiments of the present invention, a first AP set which is detected by the source AP where a station is located and includes at least one AP is determined; a target AP to which the station is handed over is selected from the first AP set according to the first AP set and a pre-stored AP set; and a handover message is transmitted to the station. The handover message is used for indicating a manner for handing over the station from the source AP to the target AP. That is, the at least one AP detected by the source AP in which the station is located is determined as the first AP set, and one AP is selected from the first AP set according to the first AP set and the pre-stored AP set as the target AP to which the station is to be handed over. Since the target AP is in a detection range of the source AP, the target AP may be detected by the station in a coverage area of the source AP. The target AP is also in the pre-stored AP set, and AP information used for connecting the target AP may be acquired, so that the handover message is transmitted to the station by using the AP information to instruct the station to be handed over from the source AP to the target AP. Therefore a problem in the related art that the target access point to which the station is handed over cannot be selected according to the source access point is solved, and the target access point to which the station is to be handed over is selected according to the source access point. In addition, by selecting, according to the source access point, the target access point to which the station is to be handed over, it may ensure that the station can detect the target access point and acquire the AP information of the target access point, thereby improving the success rate of the access point handover.

Other aspects will be apparent upon reading and understanding accompanying drawings and detailed description.

BRIEF DESCRIPTION OF DRAWINGS

FIG. 1 is a flow diagram of an alternative access point handover method according to an embodiment of the present invention;

FIG. 2 is a schematic diagram showing a data structure of an AP information list according to an embodiment of the present invention;

FIG. 3 is a schematic diagram showing a frame structure of a data frame carrying a disconnection request according to an embodiment of the present invention;

DETAILED DESCRIPTION

Figure 4:
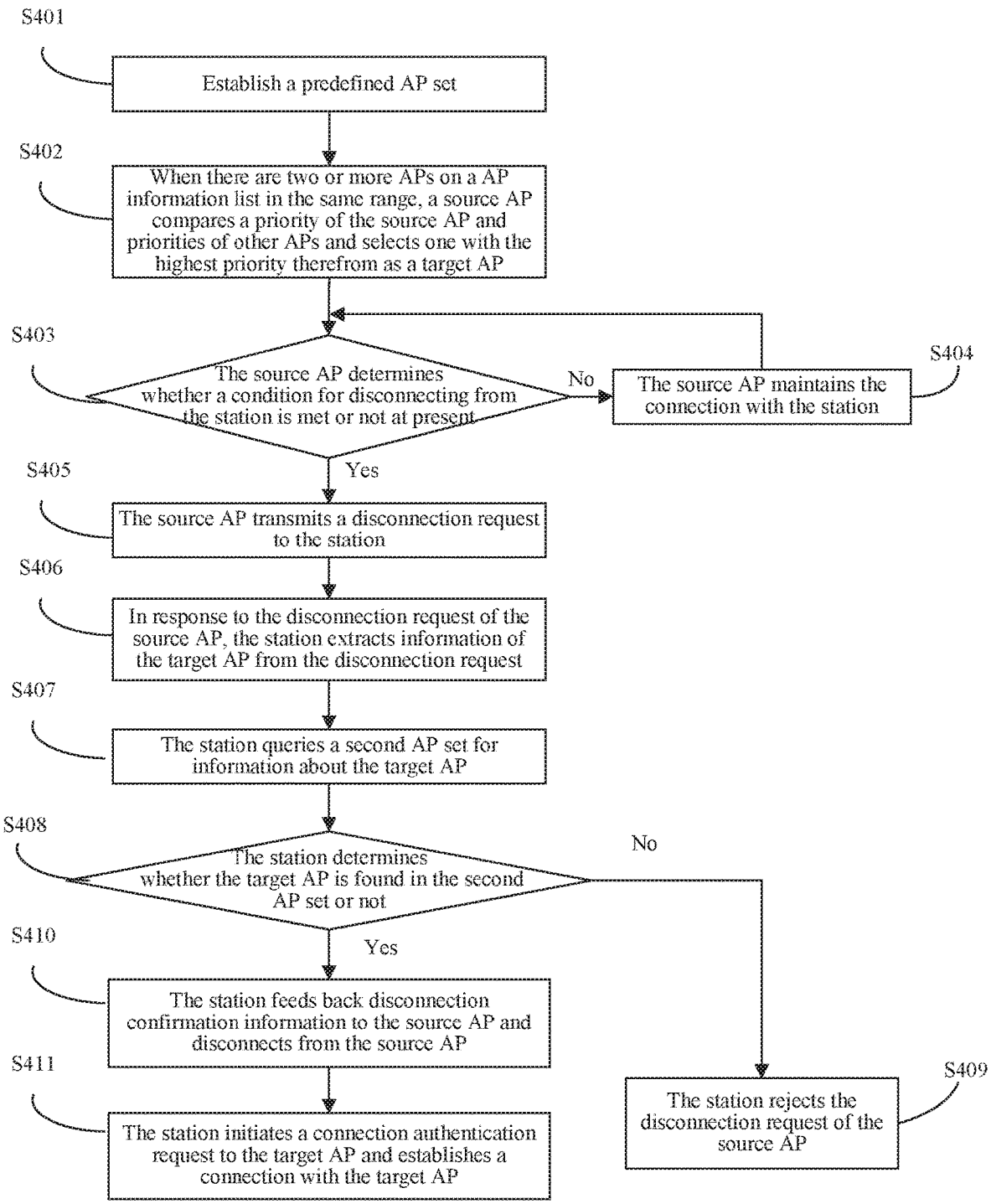
FIG. 4 is a flow diagram of an access point handover method according to an alternative embodiment of the present invention.

Embodiments of the present invention will be described in detail below with reference to accompanying drawings. It should be noted that, in the case of no conflict, embodiments and features in the embodiments in the present application may be arbitrarily combined with each other.

A First Embodiment

In this embodiment, an access point handover method is provided. FIG. 1 is a flow diagram of an alternative access point handover method according to an embodiment of the present invention. As shown in FIG. 1, the process includes the following steps.

In step S102, a first AP set including at least one AP and detected by a source access point (AP) in which a station is located is determined.

In step S104, a target AP to which a station is to be handed over is selected from the first AP set according to the first AP set and a pre-stored AP set.

In step S106, a handover message is transmitted to the station, where the handover message is used for instructing the station to be handed over from the source AP to a target AP.

Alternatively, the above access point handover method may, but is not limited to, be applied to a scenario in which the station is handed over between access points of a network to which the station is connected, for example, a scenario in which the station is handed over from one access point to another access point in a WIFI environment. In this embodiment, the access point may be, but is not limited to, a WIFI network access point, a WLAN hotspot shared by the station, and the like.

Alternatively, the above access point handover method may, but is not limited to, be applied to the AP, a base station, a server and the like. The above station may, but is not limited to, be a mobile phone, a tablet computer, a notebook computer, a portable router, a smart wearable device and the like.

By means of the above steps, at least one AP detected by a source AP where a station is located is determined as a first AP set, and one AP is selected from the first AP set according to the first AP set and a pre-stored AP set as a target AP to which the station is handed over. Since the target AP is in a detection range of the source AP, the target AP may be detected by the station which is in a coverage area of the source AP. The target AP is also in the pre-stored AP set, and AP information used for connecting the target AP may be acquired. Therefore, a handover message is transmitted to the station by using the AP information to instruct the station to be handed over from the source AP to the target AP. Therefore, a problem that the target access point to which the station is to be handed over may not be selected according to the source access point in the related art is solved, and it is achieved that the target access point to which the station is handed over is selected according to the source access point. In addition, the target access point to which the station is handed over is selected selecting according to the source access point, such configuration ensures that the station can detect the target access point and acquire the AP information of the target access point, thereby improving the success rate of the access point handover.

In this embodiment, the first AP set detected by the source AP may, but is not limited to, be APs newly appear within the detection range of the source AP, and the source AP will use the new APs as the at least one AP in the first AP set. The scenario that the new APs appear within the detection range of the source AP may, but is not limited to, be a scenario that the new APs move into the detection range of the source AP, or the source AP moves to an area having the new APs.

In this embodiment, in order to obtain an AP that is recorded in the first AP set and stored in the pre-stored AP set, it may, but is not limited to, take the media access control (MAC) address of the AP as the index of the AP. APs the MAC address of each of which is in both of the first AP set and the pre-stored AP set are obtained, and the target AP is selected therefrom.

In this embodiment, a manner of selecting the target AP may include, but is not limited to, at least one of: selecting based on a connection priority of the AP, selecting based on a signal strength, selecting based on a connection history, selecting based on a security level of the AP and selecting based on a trust degree to the AP. In this embodiment, exemplarily, the target AP is selected according to the connection priority of the AP, other manners are similar to this, and details will be omitted here.

In this embodiment, the pre-stored AP set may, but is not limited to, be stored in the source AP. The pre-stored AP set may, but is not limited to, be an AP information list. The source AP may establish this AP information list, and the AP information list may refer to a data structure which records relevant information of APs which were connected to the source AP ever before or APs whose valid information are recorded in the source AP. The valid information here may, but is not limited to, be information that can be used for authentication, for example, a service set identifier (SSID) and a connection password of the AP. The relevant information may include a field related to the connection priority of the AP, for example, a connection history with the source AP. By means of these fields, the connection priorities of the APs in the AP information list may be calculated. That is, a station is preferentially connected to a high-priority AP under the same conditions, for example, the station is handed over from a low-priority AP to a high-priority AP.

In the following example, a data structure of the AP information list is provided. FIG. 2 is a schematic diagram showing a data structure of the AP information list according to an embodiment of the present invention. As shown in FIG. 2, the AP information list may include, but is not limited to, the following fields.

AP MAC refers to a physical address of the AP and may be used as an index field of the AP information list.

AP SSID refers to a wireless network name or a wireless network identity of the AP.

Connect_His refers to the connection history between the source AP and this AP. An initial value of the Connect_His is 0. Once the source AP establishes a connection with the AP and a valid data transmission lasts for a certain duration threshold, the value of this field is increased by 1.

Alternatively, in this example, the connection priority of the AP may be calculated according to the Connect_His field.

AP Level refers to connection priority information of the AP.

Alternatively, in this example, the connection priority information of the AP may be calculated according to the Connec_His. When the Connect_His is in a certain threshold range, the value of the AP Level may be increased by 1.

Alternatively, in this example, the connection priority information of the AP may be set in advance. For example, the priority of a certain AP may be set to be "highest", in which case the connection priority of the AP may be unaffected by the Connect_His.

In this embodiment, the handover message may carry a disconnection request for requesting the station to disconnect from the source AP. The disconnection request may carry authentication information of the target AP. Alternatively, a field content of a disconnection request data frame used to carry the disconnection request may include, but is not limited to, a subtype field for indicating that a current request is the disconnection request and a frame body field for indicating an identity of the target AP, where the subtype field may be set to an undefined default value.

In the following example, a frame structure of a disconnection request data frame is provided. FIG. 3 is a schematic diagram showing a frame structure of a disconnection request data frame according to an embodiment of the present invention. As shown in FIG. 3, the frame structure of the disconnection request data frame may include, but is not limited to, the following fields.

Frame Control field: the Frame Control field of a standard frame is modified. As can be seen from the type (Type)=00 of the field, this frame is a management frame.

The following describes a standard definition of each field in the standard management frame.

The Frame Control field includes Protocol version bits, Type, Sub Type, To DS and From DS bits, More Fragment bits, Retry bits, Power Management (Pwr Mgmt) bits, More Data bits, Protected Frame bits, and Order bits; a Duration/ID field, an Address 1 field, an Address 2 field, an Address 3 field, a Sequence Control (Seq-ctl) field, an Address 4 field, and a Frame Check Sequence (FCS) field.

The definitions of the above fields are the same as those in the existing standards, which will not be repeated here.

The following are the fields in the example that are obtained by modifying the standard management frame.

Sub Type field: the Sub Type field of the standard frame is modified to form a special frame of this example for broadcasting connection information of a wireless AP itself, and a wireless AP receiving the wireless frame can also parse the wireless frame.

Alternatively, in this example, the Sub Type field is assigned with, but is not limited to, a value 0110. Since the values 0110 to 0111 and 1101 to 1111 of the Sub Type of the management frame in a standard protocol are undefined, any one of them can be used herein to distinguish the value of the Sub Type from other standard values.

Alternatively, in this example, when the Sub Type is assigned with the value 0110, it indicates that the management frame is the disconnection request data frame.

Frame body field: the frame body field is a data field of the frame, and a MAC address and SSID information of the target AP may be encapsulated in the field.

Alternatively, in the above step S104, the manner of acquiring the target AP may be, but is not limited to, steps of searching the pre-stored AP set for APs each of which has a MAC address identical to a MAC address of a respective one of the first AP set, and then acquiring an AP corresponding to a preset connection priority from the found APs as the target AP.

For example, the source AP extracts a Beacon frame of a new AP from the first AP set, extracts a MAC address in the Beacon frame, and queries the pre-stored AP set by using the MAC address as a keyword. When information of the new AP is found in the pre-stored AP set, the new AP is used as the target AP. Alternatively, when the source AP moves into an area where exist multiple APs of the pre-stored AP set, one with the highest connection priority may be selected from the multiple APs as the target AP. Alternatively, when there are two or more APs with the same connection priority in the pre-stored AP set, one AP with the highest signal strength may be selected as the target AP.

Alternatively, in this embodiment, the connection priority of the AP may, but is not limited to, be obtained according to at least one of: a connection capability of the AP, a connection history, a signal strength, a user setting and the like. For example, the pre-stored AP set stored in the source AP may, but is not limited to, be set according to the connection history (for example, the number of connections) with the source AP, for example, the more the number of connections of the AP is, the higher the connection priority is. The pre-stored AP set stored in the source AP may further, but is not limited to, be set according to the current signal strength of the AP in the set, for example, the stronger the current signal strength is, the higher the connection priority is.

By means of the above steps, APs which are identical to APs in the first AP set may be found in the pre-stored AP set by using the MAC addresses of the APs as indexes, and the target AP is selected from these APs in both of the first AP set and the pre-stored AP set according to the connection priority. That is, the source AP may select an AP with good use effect from the APs which have ever been connected to the source AP as the target AP, and instruct the station to be handed over to the target AP, so that a problem in the related art that the target access point to which the station is handed over cannot be selected according to the source access point is solved, and the target access point to which the station is handed over is selected according to the source access point. In addition, selecting, according to the source access point, the target access point to which the station is handed over may ensure that the station can detect the target access point and acquire AP information of the target access point, thereby improving the success rate of the access point handover.

Alternatively, in a case where the handover message carries the disconnection request for requesting the station to disconnect from the source AP, after the step S106, a disconnection indication message transmitted by the station in response to the disconnection request may be received. The source AP is disconnected from the station when the disconnection indication message indicates accepting the disconnection request; and the connection between the source AP and the station is maintained when the disconnection indication message indicates rejecting the disconnection request. By means of the above steps, the station may determine whether to currently disconnect from the source AP or not, and the station may determine whether to be connected to the target AP according to the capability of the target AP, so that the success rate of the access point handover is improved and the user experience is enhanced.

Alternatively, before the step S106, the field content of the disconnection request data frame for carrying the disconnection request may be set. The field content includes a field for indicating that the current request is the disconnection request and a field for indicating an identity of the target AP. For example, in a non-limiting embodiment, the subtype field in the disconnection request data frame is used as the field for indicating that the current request is the disconnection request, and the frame body field in the disconnection request data frame is used as the field for indicating the identity of the target AP. The current request can be indicated as the disconnection request by setting the subtype field to be an undefined default value.

Alternatively, before the step S106 is performed, whether the handover message is transmitted to the station or not may be determined according to the status of the data transmission between the source AP and the station. For example, in a non-limiting embodiment, whether a duration in which a data transmission rate between the source AP and the station is greater than a preset data transmission rate exceeds a preset duration or not is determined. If the duration in which the data transmission rate between the source AP and the station is greater than the preset data transmission rate exceeds the preset duration, it may be considered that the data transmission between the source AP and the station is stable, and then the source AP will maintain its connection with the station. If the duration in which the data transmission rate between the source AP and the station is greater than the preset data transmission rate is less than the preset duration, it may be considered that the data transmission between the source AP and the station is unstable, and then the source AP may transmit the handover message to the station.

For example, the source AP may decide whether to directly disconnect from the station or not. When the data transmission between the source AP and the station is stable, it is determined that the source AP cannot be directly disconnected from the station, and the data transmission is determined to be stable when the data transmission rate between the source AP and the station is maintained above a certain threshold. If the data transmission between the source AP and the station is stable, the connection is temporarily maintained, and the data transmission status will be determined again in the future. When it is found that the data transmission between the source AP and the station is unstable, the source AP is disconnected from the station.

By means of the above steps, an opportunity of instructing the station for access point handover may be determined. If the current connection is being used, or the data transmission is stable, the current connection is temporarily maintained. When the use status ends, or the data transmission is unstable, the station is instructed to be handed over to another access point. In this way, the quality of data transmission may be guaranteed and the user experience is enhanced.

Alternatively, after the above step S106, the station may receive the handover message, and is handed over from the source AP to the target AP according to an indication of the handover message, so as to implement the access point handover for the station.

In the following alternative example, an access point handover method is further provided. FIG. 4 is a flow diagram of an access point handover method according to an alternative example of the present invention. As shown in FIG. 4, the process includes the following steps.

In step S401, a pre-stored AP set, for example, an AP information list, is established.

In step S402, when two or more APs on the AP information list exist in the same range, a source AP (an AP to which a station is currently connected) compares the priority of the source AP and priorities of other APs, and selects one with the highest priority therefrom as a target AP.

In step S403, the source AP determines whether a condition for disconnecting from the station is currently met or not, for example, whether the data transmission between the source AP and the station is stable or not. If the condition is not met, the method proceeds to a step S404, and if the condition is met, the method proceeds to a step S405.

In step S404, the source AP proceeds to maintain the connection with the station, and the step S403 is repeated.

In step S405, the source AP transmits a disconnection request to the station, where the disconnection request includes information of the target AP.

In step S406, the station extracts information of the target AP in disconnection request in response to the disconnection request of the AP.

In step S407, the station queries a second AP set and search for the information of the target AP.

In step S408, according to a searching result, the station determines whether the target AP is found in the second AP set or not. When the station finds valid information of the target AP, the step proceeds to a step S410, and otherwise, the method proceeds to a step S409.

In step S409, the station rejects the disconnection request of the source AP.

In step S410, the station feeds back disconnection confirmation information to the source AP, and disconnects from the source AP.

In step S411, the station initiates a connection authentication request to the target AP, and establishes a connection with the target AP.

For deficiencies in the prior art, according to the access point handover method provided by this the non-limiting embodiment, when environment changes, the source AP that is currently connected to the station searches an AP information list stored in the source AP according to information of the currently detected new APs, and the source AP selects a new AP with the highest priority and transmits the new AP to the station in a WIFI signaling manner. Further, the station determines whether to perform access point handover. When the handover condition is met, the station disconnects from the current source AP, and requests to connect to a higher-quality target AP, so that the user experience of the product is enhanced.

By means of the description of the embodiment, those skilled in the art may clearly understand that the method according to the embodiment may be implemented by means of software plus a necessary general hardware platform, and certainly, and may also be implemented by means of hardware, but in many cases the former is a better implementation. Based on such an understanding, a technical solution of the present invention, which is essential or contributes to the prior art, may be embodied in the form of a software product stored in a storage medium (such as a ROM/RAM, a disk, an optical disc), the storage medium includes a number of instructions for causing a station device (which may be a cell phone, a computer, a server, a network device, and the like.) to perform the methods described in various embodiments of the present invention.

A Second Embodiment

Figure 5:
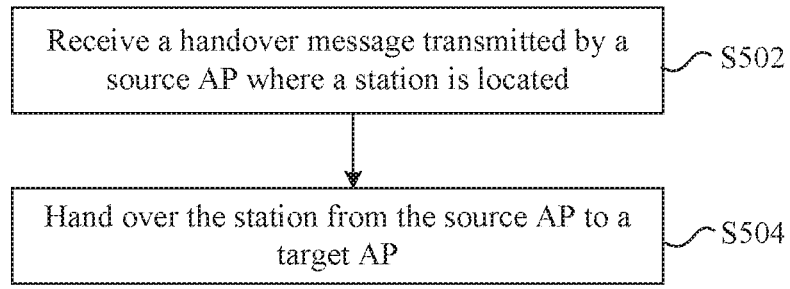
FIG. 5 is a flow diagram of another alternative access point handover method according to an embodiment of the present invention.

An access point handover method is provided in this embodiment. FIG. 5 is a flow diagram of another alternative access point handover method according to an embodiment of the present invention. As shown in FIG. 5, the process includes the following steps.

In step S502, a handover message transmitted by a source access point (AP) where a station is located is received. The handover message is configured to instruct the station to be handed over from the source AP to a target AP. The target AP is selected by the source AP from a first AP set according to the first AP set and a pre-stored AP set. The first AP set is detected by the source AP and includes at least one AP.

In step S504, the station is handed over from the source AP to the target AP.

Alternatively, the above access point handover method may, but is not limited to, be applied to a scenario in which the station is handed over between access points of a network to which the station is connected, for example, a scenario in which the station is handed over from one access point to another access point in a WIFI environment. In this embodiment, the access point may be, but is not limited to, a WIFI network access point, a WLAN hotspot shared by the station, and the like.

Alternatively, the above access point handover method may, but is not limited to, be applied to a station. The station may, but is not limited to, be a mobile phone, a tablet computer, a notebook computer, a portable router, a smart wearable device and the like.

By means of the above steps, the station receives handover message, which is used for instructing the station to be handed over to the target AP, transmitted by the source AP, and then the station is handed over from the source AP to the target AP according to an indication of the handover message, so that a problem that the target access point to which the station is to be handed over cannot be selected according to the source access point in the related art is solved, and the target access point to which the station is to be handed over is selected according to the source access point.

In this embodiment, a manner of handing over the station from the source AP to the target AP may, but is not limited to, be a manner that the station directly disconnects from the source AP, and connects to the target AP according to the information of the target AP carried in the indication information, thereby improving the efficiency of the access point handover. In a non-limiting embodiment, the station determines whether to connect to the target AP according to the information of the target AP when receiving the handover message. For example, the station may determine whether to be handed over to the target AP by determining whether the target AP is in the second AP set stored by the station or not. If the target AP is in the second AP set stored by the station, the target AP may be considered to be connectable, or may be considered to be trustable, and the station will be handed over from the source AP to the target AP, so that the user experience is enhanced. In addition, selecting, according to the source access point, the target access point to which the station is to be handed over may ensure that the station can detect the target access point and acquire the AP information of the target access point, thereby improving the success rate of the access point handover. Further, if the target AP is found in the second AP set of the station, it indicates that the station was connected to the target AP ever before, or it indicates that the target AP is trustable, thereby improving the security of the access point handover.

In this embodiment, the pre-stored AP set may, but is not limited to, be stored in the source AP. The pre-stored AP set may, but is not limited to, be an AP information list. The source AP may establish this AP information list, and the AP information list may refer to a data structure which records relevant information of APs which were connected to the source AP ever before or APs whose valid information are recorded in the source AP. The valid information here may, but is not limited to, be information that can be used for authentication, for example, a service set identifier (SSID) and a connection password of the AP. The relevant information may include a field related to the connection priority of the AP, for example, a connection history with the source AP. By means of these fields, the connection priorities of the APs in the AP information list may be calculated. That is, a station is preferentially connected to a high-priority AP under the same conditions, for example, the station is handed over from a low-priority AP to a high-priority AP.

In the following example, a data structure of an AP information list is provided. As shown in FIG. 2, the AP information list may include, but is not limited to, the following fields.

AP MAC refers to a physical address of the AP and may be used as an index field of the AP information list.

AP SSID refers to a wireless network name or a wireless network identity of the AP.

Connect_His refers to the connection history between the source AP and this AP. An initial value of the Connect_His is 0. Once the source AP establishes a connection with the AP and a valid data transmission lasts for a certain duration threshold, the value of this field is increased by 1.

Alternatively, in this example, the connection priority of the AP may be calculated according to the Connect_His field.

AP Level refers to connection priority information of the AP.

Alternatively, in this example, the connection priority information of the AP may be calculated according to the Connec_His. When the Connect_His is in a certain threshold range, the value of the AP Level may be increased by 1.

Alternatively, in this example, the connection priority information of the AP may be set in advance. For example, the priority of a certain AP may be set to be "highest", in which case the connection priority of the AP may be unaffected by the Connect_His.

In this embodiment, the handover message may carry a disconnection request for requesting the station to disconnect from the source AP. The disconnection request may carry authentication information of the target AP. Alternatively, a field content of a disconnection request data frame used to carry the disconnection request may include, but is not limited to, a subtype field for indicating that a current request is the disconnection request and a frame body field for indicating an identity of the target AP, where the subtype field may be set to an undefined default value.

In the following example, a frame structure of a disconnection request data frame is provided. As shown in FIG. 3, the frame structure of the disconnection request data frame may include, but is not limited to, the following fields.

Frame Control field: the Frame Control field of a standard frame is modified. As can be seen from the type (Type)=00 of the field, this frame belongs to a management frame.

The following describes a standard definition of each field in the standard management frame.

The Frame Control field includes Protocol version bits, Type, Sub Type, To DS and From DS bits, More Fragment bits, Retry bits, Power Management (Pwr Mgmt) bits, More Data bits, Protected Frame bits, and Order bits; a Duration/ID field, an Address 1 field, an Address 2 field, an Address 3 field, a Sequence Control (Seq-ctl) field, an Address 4 field, and a Frame Check Sequence (FCS) field.

The definitions of the above fields are the same as those in the existing standards, which will be omitted here.

The following are the fields in the example that are obtained by modifying the standard management frame.

Sub Type field: the Sub Type field of the standard frame is modified to form a special frame of this example for broadcasting connection information of a wireless AP itself, and a wireless AP receiving the wireless frame can also parse the wireless frame.

Alternatively, in this example, the Sub Type field is assigned with, but is not limited to, a value 0110. Since the values 0110 to 0111 and 1101 to 1111 of the Sub Type of the management frame in a standard protocol are undefined, any one of them can be used herein to distinguish the value of the Sub Type from other standard values.

Alternatively, in this example, when the Sub Type is assigned with the value 0110, it indicates that the management frame is the disconnection request data frame.

Frame body field: the frame body field is a data field of the frame, and a MAC address and SSID information of the target AP may be encapsulated in the field.

Alternatively, in the above step S504, one alternative manner of handing over the station from the source AP to the target AP is as follows. Whether the target AP is in the second AP set stored by the station is determined, and then the station is handed over from the source AP to the target AP upon the determination that the target AP is in the second AP set stored by the station.

In this embodiment, the second AP set may, but is not limited to, be the AP information list. The station may establish this AP information list, and this AP information list may refer to a data structure which records relevant information of APs which were connected with the station or APs whose valid information are recorded in the station. The valid information here may, but is not limited to, be information that can be used for authentication, for example, a service set identifier (SSID) and a connection password of the AP. The relevant information may include a field related to the connection priority of the AP, for example, a connection history with the source AP. By means of these fields, the connection priority of each AP in the AP information list may be calculated, that is, a certain station is preferentially connected to a high-priority AP under the same conditions, for example, the station is handed over from a low-priority AP to a high-priority AP.

By means of the above steps, the target access point to which the station is to be handed over is selected according to the source access point, which may ensure that the station can detect the target access point and obtain the AP information of the target access point, thereby improving the success rate of the access point handover. Further, if the target AP may be found in the second AP set of the station, it indicates that the station was connected to the target AP ever before, or it indicates that the target AP is trustable, thereby improving the security of the access point handover.

Alternatively, in a case that the handover message carries a disconnection request for requesting the station to disconnect from the source AP, in the step S504, in response to determining that the target AP is in the second AP set stored by the station, a disconnection indication message for indicating accepting the disconnection request is transmitted to the source AP, and the station is disconnected from the source AP. In response to determining that the target AP is not in the second AP set stored by the station, a disconnection indication message for indicating rejecting the disconnection request is transmitted to the source AP, and the connection between the station and the source AP is maintained.

For example, in response to the disconnection request from the source AP, the station extracts the valid information of the target AP from the disconnection request, and then searches the AP information list stored by the station for information of the target AP, and determines whether valid information of the target AP is found in the AP information list or not. When the station does not find the information of the target AP in the AP information list stored by the station, the station feeds back response information of the disconnection request to the source AP, and rejects the disconnection request of the source AP. When the station finds the information of the target AP in the AP information list, the station feeds back response information of the disconnection request to the source AP, disconnects from the source AP, initiates a connection request to the target AP, and establishes a connection with the target AP.

By means of the above steps, the station may select whether to currently disconnect from the source AP or not, and the station may select whether to connect to the target AP according to the capability of the target AP, thereby improving the success rate of the access point handover and enhancing the user experience.

For deficiencies in the prior art, according to the access point handover method provided by this the non-limiting embodiment, when environment changes, the source AP that is currently connected to the station searches an AP information list stored in the source AP according to information of the currently detected new APs, and the source AP selects a new AP with the highest priority and transmits the new AP to the station in a WIFI signaling manner. Further, the station determines whether to perform access point handover. When the handover condition is met, the station disconnects from the current source AP, and requests to connect to a higher-quality target AP, so that the user experience of the product is enhanced.

By means of the description of the embodiment, those skilled in the art may clearly understand that the method according to the embodiment may be implemented by means of software plus a necessary general hardware platform, and certainly, and may also be implemented by means of hardware, but in many cases the former is a better implementation. Based on such an understanding, a technical solution of the present invention, which is essential or contributes to the prior art, may be embodied in the form of a software product stored in a storage medium (such as a ROM/RAM, a disk, an optical disc), the storage medium includes a number of instructions for causing a station device (which may be a cell phone, a computer, a server, a network device, and the like.) to perform the methods described in various embodiments of the present invention.

A Third Embodiment

In this embodiment, an access point handover device is further provided, which is used to implement the above embodiments and preferred examples, and details which have been described will not be repeated hereafter. As used below, the term "module" may a combination of software and/or hardware capable of implementing a predetermined function. Although the device described in the following embodiment is preferably implemented in software, implementation in hardware, or a combination of software and hardware is also possible and conceivable.

Figure 6:
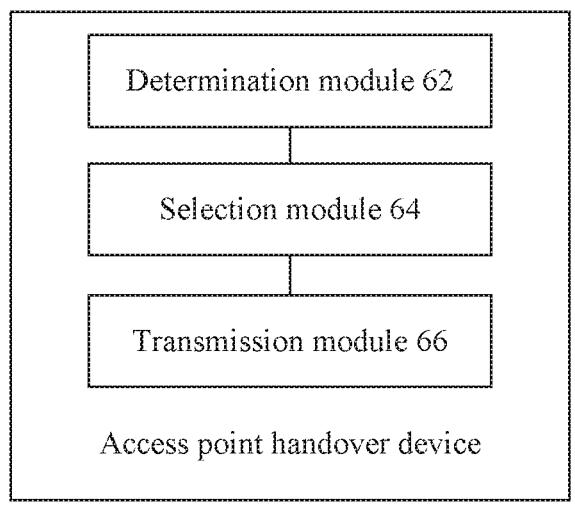
FIG. 6 is a structural block diagram showing an alternative access point handover device according to an embodiment of the present invention.

FIG. 6 is a structural block diagram showing an alternative access point handover device according to an embodiment of the present invention. As shown in FIG. 6, the apparatus includes:

1) a determination module 62, which is configured to determine a first AP set detected by a source access point AP where a station is located, where the first AP set includes at least one AP;

2) a selection module 64, which is coupled to the determination module 62 and configured to select a target AP from a first AP set according to the first AP set and a pre-stored AP set, where the station is be handed over to the target AP; and 3) a transmission module 66, which is coupled to the selection module 64 and configured to transmit a handover message to the station, where the handover message is used for instructing the station to be handed over from the source AP to a target AP.

Alternatively, the above access point handover device may, but is not limited to, be applied to a scenario in which the station is handed over between access points of a network to which the station is connected, for example, a scenario in which the station is handed over from one access point to another access point in a WIFI environment. In this embodiment, the access point may be, but is not limited to, a WIFI network access point, a WLAN hotspot shared by the station, and the like.

Alternatively, the above access point handover device may, but is not limited to, be applied to an AP, a base station, a server and the like. The above station may, but is not limited to, be a mobile phone, a tablet computer, a notebook computer, a portable router, a smart wearable device and the like.

By means of the device, the determination module 62 determines at least one AP detected by a source AP in which a station is located as a first AP set, and the selection module 64 selects one AP from the first AP set according to the first AP set and a pre-stored AP set as a target AP to which the station is to be handed over. Since the target AP is in a detection range of the source AP, the target AP may be detected by the station in a coverage area of the source AP. The target AP is also in the pre-stored AP set, AP information used for connecting the target AP may be acquired, and the transmission module 66 may transmit a handover message to the station by using the AP information to instruct the station to be handed over from the source AP to the target AP, and thus a problem that the target access point to which the station is handed over may not be selected according to the source access point in the related art is solved, and the target access point to which the station is handed over is selected according to the source access point. In addition, the target access point to which the station is to be handed over is selected selecting according to the source access point, which may ensure that the station can detect the target access point and acquire the AP information of the target access point, thereby improving the success rate of the access point handover.

In this embodiment, the first AP set detected by the source AP may, but is not limited to, be APs newly appear within the detection range of the source AP, and the source AP will use the new APs as the at least one AP in the first AP set. The scenario that the new APs appear within the detection range of the source AP may, but is not limited to, be a scenario that the new APs move into the detection range of the source AP, or the source AP moves to an area having the new APs.

In this embodiment, in order to obtain an AP that is recorded in the first AP set and stored in the pre-stored AP set, the selection module 64 may, but is not limited to, take the media access control (MAC) address of the AP as the index of the AP. APs the MAC address of each of which is in both of the first AP set and the pre-stored AP set are obtained, and the target AP is selected therefrom.

In this embodiment, the selection module 64 may select the target AP in at least one non-limiting manners: selecting based on a connection priority of the AP, selecting based on a signal strength, selecting based on a connection history, selecting based on a security level of the AP and selecting based on a trust degree to the AP.

In this embodiment, the pre-stored AP set may, but is not limited to, be stored in the source AP. The pre-stored AP set may, but is not limited to, be an AP information list. The source AP may establish this AP information list, and the AP information list may refer to a data structure which records relevant information of APs which were connected to the source AP ever before or APs whose valid information are recorded in the source AP. The valid information here may, but is not limited to, be information that can be used for authentication, for example, a service set identifier (SSID) and a connection password of the AP. The relevant information may include a field related to the connection priority of the AP, for example, a connection history with the source AP. By means of these fields, the connection priorities of the APs in the AP information list may be calculated. That is, a station is preferentially connected to a high-priority AP under the same conditions, for example, the station is handed over from a low-priority AP to a high-priority AP.

In the following example, a data structure of the AP information list is provided. As shown in FIG. 2, the AP information list may include, but is not limited to, the following fields.

AP MAC refers to a physical address of the AP and may be used as an index field of the AP information list.

AP SSID refers to a wireless network name or a wireless network identity of the AP.

Connect_His refers to the connection history between the source AP and this AP. An initial value of the Connect_His is 0. Once the source AP establishes a connection with the AP and a valid data transmission lasts for a certain duration threshold, the value of this field is increased by 1.

Alternatively, in this example, the connection priority of the AP may be calculated according to the Connect_His field.

AP Level refers to connection priority information of the AP.

Alternatively, in this example, the connection priority information of the AP may be calculated according to the Connec_His. When the Connect_His is in a certain threshold range, the value of the AP Level may be increased by 1.

Alternatively, in this example, the connection priority information of the AP may be preset, for example, the priority of a certain AP may be set to be "highest", in which case the connection priority of the AP may be unaffected by the Connect_His.

In this embodiment, the handover message may carry a disconnection request for requesting the station to disconnect from the source AP. The disconnection request may carry authentication information of the target AP. Alternatively, a field content of a disconnection request data frame used for carrying the disconnection request may include, but is not limited to, a subtype field for indicating that a current request is the disconnection request and a frame body field for indicating an identity of the target AP, where the subtype field may be set to an undefined default value.

In the following example, a frame structure of a disconnection request data frame is provided. As shown in FIG. 3, the frame structure of the disconnection request data frame may include, but is not limited to, the following fields.

Frame Control field: the Frame Control field of a standard frame is modified. As can be seen from the type (Type)=00 of the field, this frame is a management frame.

The following describes a standard definition of each field in the standard management frame.

The Frame Control field includes Protocol version bits, Type, Sub Type, To DS and From DS bits, More Fragment bits, Retry bits, Power Management (Pwr Mgmt) bits, More Data bits, Protected Frame bits, and Order bits; a Duration/ID field, an Address 1 field, an Address 2 field, an Address 3 field, a Sequence Control (Seq-ctl) field, an Address 4 field, and a Frame Check Sequence (FCS) field.

The definitions of the above fields are the same as those in the existing standards, which will be omitted here.

The following are the fields in the example that are obtained by modifying the standard management frame.

Sub Type field: the Sub Type field of the standard frame is modified to form a special frame of this example for broadcasting connection information of a wireless AP itself, and a wireless AP receiving the wireless frame can also parse the wireless frame.

Alternatively, in this example, the Sub Type field is assigned with, but is not limited to, a value 0110. Since the values 0110 to 0111 and 1101 to 1111 of the Sub Type of the management frame in a standard protocol are undefined, any one of them can be used herein to distinguish the value of the Sub Type from other standard values.

Alternatively, in this example, when the Sub Type is assigned with the value 0110, it indicates that the management frame is the disconnection request data frame.

Frame body field: the frame body field is a data field of the frame, and a MAC address and SSID information of the target AP may be encapsulated in the field.

Alternatively, the selection module 64 includes:

1) a search unit, which is configured to search the pre-stored AP set for APs a MAC addresses of each of which is identical to a MAC address of a respective one in the first AP set; and 2) an acquisition unit, which is coupled to the search unit and configured to acquire an AP corresponding to a preset connection priority from the found APs as the target AP.

Alternatively, in this embodiment, the connection priority of the AP may, but is not limited to, be obtained according to at least one of: a connection capability of the AP, a connection history, a signal strength, a user setting and the like. For example, the pre-stored AP set stored in the source AP may, but is not limited to, be set according to the connection history with the source AP (for example, the number of connections), for example, the more the number of connections of the AP is, the higher the connection priority is. The pre-stored AP set stored in the source AP may further, but is not limited to, be set according to the current signal strength of the AP in the set, for example, the stronger the current signal strength is, the higher the connection priority is.

By means of the above device, the acquisition unit may APs which are identical to APs in the first AP set may be found in the pre-stored AP set by using the MAC addresses of the APs as indexes, and the target AP is selected from these APs in both of the first AP set and the pre-stored AP set according to the connection priority. That is, the source AP may select an AP with good use effect from the APs which have ever been connected to the source AP as the target AP, and instruct the station to be handed over to the target AP, so that a problem in the related art that the target access point to which the station is handed over cannot be selected according to the source access point is solved, and the target access point to which the station is handed over is selected according to the source access point. In addition, selecting, according to the source access point, the target access point to which the station is handed over may ensure that the station can detect the target access point and acquire AP information of the target access point, thereby improving the success rate of the access point handover.

Alternatively, the handover message may, but is limited to, carry a disconnection request for requesting the station to disconnect from the source AP.

Alternatively, the device further includes:

1) a second reception module, which is coupled to the transmission module 66 and configured to receive a disconnection indication message that is transmitted by the station in response to the disconnection request;

2) a disconnection module, which is coupled to the second reception module and configured to disconnect the source AP from the station when the disconnection indication message indicates accepting the disconnection request; and 3) a maintaining module, which is coupled to the disconnection module and configured to maintain the connection between the source AP and the station when the disconnection indication message indicates rejecting the disconnection request.

By means of the above steps, the station can select whether to currently disconnect from the source AP, and the station can select whether to connect to the target AP according to the capability of the target AP, so that the success rate of the access point handover is improved and the user experience is enhanced.

Alternatively, the device further includes a setting module, which is coupled between the selection module 54 and the transmission module 56 and configured to set a field content of the disconnection request data frame for carrying the disconnection request. The field content includes a field for indicating that the current request is the disconnection request and a field for indicating an identity of the target AP. For example, in a non-limiting embodiment, the subtype field in the disconnection request data frame is used as the field for indicating that the current request is the disconnection request, and the frame body field in the disconnection request data frame is used as the field for indicating the identity of the target AP. The current request can be indicated as the disconnection request by setting the subtype field to be an undefined default value.

Alternatively, the transmission module 66 includes:

1) a determination unit, which is configured to determine whether to transmit the handover message to the station or not according to a status of a data transmission between the source AP and the station;

2) a maintaining unit, which is coupled to the determination unit and configured to: upon a determination that a duration in which a data transmission rate between the source AP and the station is greater than a preset data transmission rate exceeds the preset duration, maintain a connection between the source AP and the station; and 3) a transmission unit, which is coupled to the decision unit and configured to: upon a determination the duration in which the data transmission rate between the source AP and the station is greater than the preset data transmission rate is less than the preset duration, transmit the handover message to the station.

By means of the device, the determination unit determines an opportunity of instructing the station for the access point handover, and the maintaining unit and the transmission unit process the connection according to a determination result. If the current connection is being used, or the data transmission is stable, the maintaining unit temporarily maintains the connection between the station and the source AP. When the use status is exited, or the data transmission is unstable, the transmission unit instructs the station for the access point handover. In this way, the quality of data transmission may be ensured and the user experience is enhanced.

For deficiencies in the prior art, according to the access point handover device provided this the non-limiting embodiment, when environment changes, the source AP that is currently connected to the station searches an AP information list stored in the source AP according to information of the currently detected new APs, and the source AP selects a new AP with the highest priority and transmits the new AP to the station in a WIFI signaling manner. Further, the station determines whether to perform access point handover. When the handover condition is met, the station disconnects from the current source AP, and requests to connect to a higher-quality target AP, so that the user experience of the product is enhanced.

It should be noted that the above modules may be implemented by software or hardware. For the latter, the above modules may be implemented by, but not limited to, the above modules are all located in the same processor; or, the modules are located in multiple processors, respectively.

A Fourth Embodiment

In this embodiment, an access point handover device is further provided, which is used to implement the above embodiments and preferred examples, and details which has been described will not be repeated herein. As used below, the term "module" may a combination of software and/or hardware capable of implementing a predetermined function. Although the device described in the following embodiment is preferably implemented in software, implementation in hardware, or a combination of software and hardware is also possible and conceivable.

Figure 7:
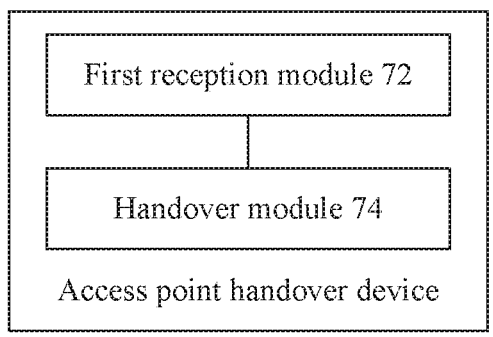
FIG. 7 is a structural block diagram showing another alternative access point handover device according to an embodiment of the present invention.

FIG. 7 is a structural block diagram showing another alternative access point handover device according to an embodiment of the present invention. As shown in FIG. 7, the device includes:

1) a first reception module 72, which is configured to receive a handover message transmitted by a source AP where a station is located. The handover message is configured to instruct the station to be handed over from the source AP to the target AP. The target AP is selected by the source AP from a first AP set according to the first AP set and a pre-stored AP set. The first AP set is detected by the source AP and includes at least one AP.

2) a handover module 74, which is coupled to the first reception module 72 and configured to hand over the station from the source AP to the target AP.

Alternatively, the above access point handover device may, but is not limited to, be applied to a scenario in which the station is handed over between access points of a network to which the station is connected, for example, a scenario in which the station is handed over from one access point to another access point in a WIFI environment. In this embodiment, the access point may be, but is not limited to, a WIFI network access point, a WLAN hotspot shared by the station, and the like.

Alternatively, the above access point handover device may, but is not limited to, be applied to a station. The above station may, but is not limited to, be a mobile phone, a tablet computer, a notebook computer, a portable router, a smart wearable device and the like.

By means of the above steps, the first reception module 72 receives the handover message which is transmitted by the source AP and used for instructing the station to be handed over to the target AP, and the handover module 74 hands over the station from the source AP to the target AP according to an indication of the handover message, so that a problem that the target access point to which the station is to be handed over cannot be selected according to the source access point in the related art is solved, and the target access point to which the station is to be handed over is selected according to the source access point.

In this embodiment, a manner of handing over the station from the source AP to the target AP may, but is not limited to, be a manner that the station directly disconnects from the source AP, and connects to the target AP according to the information of the target AP carried in the indication information, thereby improving the efficiency of the access point handover. In a non-limiting embodiment, the station determines whether to connect to the target AP according to the information of the target AP when receiving the handover message. For example, the station may determine whether to be handed over to the target AP by determining whether the target AP is in the second AP set stored by the station or not. If the target AP is in the second AP set stored by the station, the target AP may be considered to be connectable, or may be considered to be trustable, and the station will be handed over from the source AP to the target AP, so that the user experience is enhanced. In addition, the target access point to which the station is to be handed over is selected according to the source access point, so it is ensured that the station can detect the target access point and acquire the AP information of the target access point, thereby improving the success rate of the access point handover. Further, if the target AP is found in the second AP set of the station, it indicates that the station was connected to the target AP ever before, or it indicates that the target AP is trustable, thereby improving the security of the access point handover.

In this embodiment, the pre-stored AP set may, but is not limited to, be stored in the source AP. The pre-stored AP set may, but is not limited to, be an AP information list. The source AP may establish this AP information list, and the AP information list may refer to a data structure which records relevant information of APs which were connected to the source AP ever before or APs whose valid information are recorded in the source AP. The valid information herein may, but is not limited to, be information that can be used for authentication, for example, a service set identifier (SSID) and a connection password of the AP. The relevant information may include a field related to the connection priority of the AP, for example, a connection history with the source AP. By means of these fields, the connection priorities of the APs in the AP information list may be calculated. That is, a station is preferentially connected to a high-priority AP under the same conditions, for example, the station is handed over from a low-priority AP to a high-priority AP.

In the following example, a data structure of the AP information list is provided. As shown in FIG. 2, the AP information list may include, but is not limited to, the following fields.

AP MAC refers to a physical address of the AP and may be used as an index field of the AP information list.

AP SSID refers to a wireless network name or a wireless network identity of the AP.

Connect_His refers to the connection history between the source AP and this AP. An initial value of the Connect_His is 0. Once the source AP establishes a connection with the AP and a valid data transmission lasts for a certain duration threshold, the value of this field is increased by 1.

Alternatively, in this example, the connection priority of the AP may be calculated according to the Connect_His field.

AP Level refers to connection priority information of the AP.

Alternatively, in this example, the connection priority information of the AP may be calculated according to the Connec_His. When the Connect_His is in a certain threshold range, the value of the AP Level may be increased by 1.

Alternatively, in this example, the connection priority information of the AP may be set in advance. For example, the priority of a certain AP may be set to be "highest", in which case the connection priority of the AP may be unaffected by the Connect_His.

In this embodiment, the handover message may carry a disconnection request for requesting the station to disconnect from the source AP. The disconnection request may carry authentication information of the target AP. Alternatively, a field content of a disconnection request data frame used to carry the disconnection request may include, but is not limited to, a subtype field for indicating that a current request is the disconnection request and a frame body field for indicating an identity of the target AP, where the subtype field may be set to an undefined default value.

In the following example, a frame structure of the disconnection request data frame is provided. As shown in FIG. 3, the frame structure of the disconnection request data frame may include, but is not limited to, the following fields.

Frame Control field: the Frame Control field of a standard frame is modified. As can be seen from the type (Type)=00 of the field, this frame is a management frame.

The following describes a standard definition of each field in the standard management frame.

The Frame Control field includes Protocol version bits, Type, Sub Type, To DS and From DS bits, More Fragment bits, Retry bits, Power Management (Pwr Mgmt for short) bits, More Data bits, Protected Frame bits, and Order bits; a Duration/ID field, an Address 1 field, an Address 2 field, an Address 3 field, a Sequence Control (Seq-ctl for short) field, an Address 4 field, and a Frame Check Sequence (FCS) field.

The definitions of the above fields are the same as those in the existing standards, which will be omitted here.

The following are the fields in the example that are obtained by modifying the standard management frame.

Sub Type field: the Sub Type field of the standard frame is modified to form a special frame of this example for broadcasting connection information of a wireless AP itself, and a wireless AP receiving the wireless frame can also parse the wireless frame.

Alternatively, in this example, the Sub Type field is assigned with, but is not limited to, a value 0110. Since the values 0110 to 0111 and 1101 to 1111 of the Sub Type of the management frame in a standard protocol are undefined, any one of them can be used herein to distinguish the value of the Sub Type from other standard values.

Alternatively, in this example, when the Sub Type is assigned with the value 0110, it indicates that the management frame is the disconnection request data frame.

Frame body field: the frame body field is a data field of the frame, and a MAC address and SSID information of the target AP may be encapsulated in the field.

Alternatively, the handover module 74 includes:

1) a determination unit, which is configured to determine whether the target AP is in the second AP set stored by the station or not; and 2) a handover unit, which is coupled to the determination unit and configured to: upon a determination that the target AP is in the second AP set stored by the station, hand over the station from the source AP to the target AP.

In this embodiment, the second AP set may, but is not limited to, be an AP information list. The station may establish this AP information list, and this AP information list may refer to a data structure which records relevant information of APs which were connected with the station or APs whose valid information are recorded in the station. The valid information here may, but is not limited to, be information that can be used for authentication, for example, a SSID and a connection password of the AP. The relevant information may include a field related to the connection priority of the AP, for example, a connection history with the source AP. By means of these fields, the connection priority of each AP in the AP information list may be calculated, that is, a certain station is preferentially connected to a high-priority AP under the same conditions, for example, the station is handed over from a low-priority AP to a high-priority AP.

With the above device, the target access point to which the station is to be handed over is selected according to the source access point, so it is ensured that the station can detect the target access point and obtain the AP information of the target access point, thereby improving the success rate of the access point handover. Optionally, if the target AP is found in the second AP set of the station, it indicates that the station was connected to the target AP before, or it indicates that the target AP is trustable, thereby improving the security of the access point handover.

Alternatively, the handover message carries a disconnection request, which is configured to request the station to disconnect from the source AP.

Alternatively, after it is determined whether the target AP is in the second AP set stored by the station, the handover module 74 further includes:

1) a first transmission unit, which is coupled to the determination unit and configured to: upon determining that the target AP is in the second AP set stored by the station, transmit a disconnection indication message for indicating accepting the disconnection request to the source AP, and disconnect the station from the source AP; and 2) a second transmission unit, which is coupled to the determination unit and configured to: upon determining that the target AP is not in the second AP set stored by the station, transmit a disconnection indication message for indicating rejecting the disconnection request to the source AP, and maintain the connection between the station and the source AP.

Figure 8:
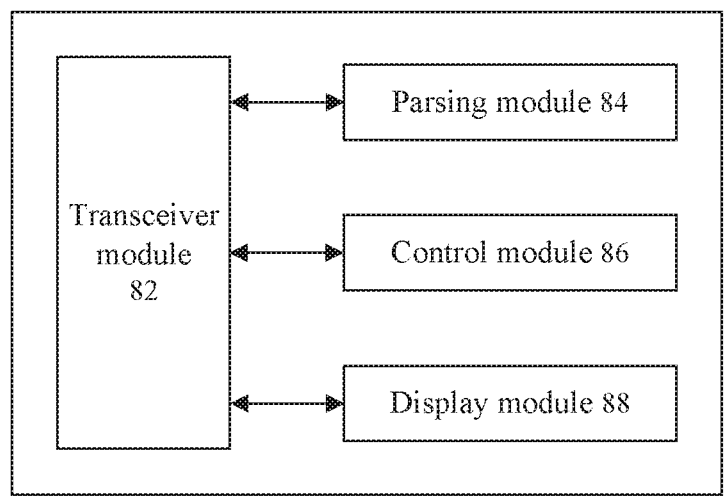
FIG. 8 is a structural block diagram showing a WIFI access point handover device according to an alternative embodiment of the present invention.

In an alternative embodiment, a WIFI access point handover device is further provided. FIG. 8 is a structural block diagram of the WIFI access point handover device according to an alternative embodiment of the present invention. As shown in FIG. 8, the device includes:

1) a transceiver module 82, which is configured to transmit a message to another WIFI device or receive a message from another WIFI device;

2) a parsing module 84, which is coupled to the transceiver module 82 and configured to parse the messages transmitted by another WIFI device;

3) a control module 86, which is coupled to the transceiver module 82 and configured to control the WIFI access point handover; and 4) a display module 88, which is coupled to the transceiver module 82 and configured to display connection levels of APs available to a user within a current range, display an access point handover request, and display a request for collecting AP information to the user.

For deficiencies in the prior art, according to the access point handover device provided by this non-limiting embodiment, the source AP that is currently connected to the station searches an AP information list stored in the source AP according to information of the currently detected new APs based on an environment change, and the source AP selects a new AP with the highest priority and transmits the new AP to the station in a WIFI signaling manner. Further, the station determines whether to perform access point handover. When the handover condition is met, the station disconnects from the current source AP, and requests to connect to a higher-quality target AP, so that the user experience of the product is enhanced.

It should be noted that the above modules may be implemented by software or hardware. For the latter, the above modules may be implemented by, but not limited to, the following manners: the above modules are all located in the same processor; or, the modules are located in multiple processors, respectively.

A Fifth Embodiment

Embodiments of the present invention further provide a storage medium. Alternatively, in this embodiment, the storage medium may be configured to store program codes for performing the following steps.

In step S1, a first AP set detected by a source AP where a station is located is determined, where the first AP set includes at least one AP.

In step S2, a target AP to which the station is handed over is selected from the first AP set according to the first AP set and a pre-stored AP set.

In step S3, a handover message is transmitted to the station, where the handover message is configured to instruct the station to be handed over from the source AP to a target AP.

Alternatively, the storage medium is further configured to store program codes for performing the following steps.

In step S1, a handover message transmitted by a source AP where a station is located is received. The handover message is configured to instruct the station to be handed over from the source AP to a target AP. The target AP is selected by the source AP from a first AP set according to the first AP set and a pre-stored AP set. The first AP set is detected by the source AP and includes at least one AP.

S2, the station is handed over from the source AP to the target AP.

Alternatively, in this embodiment, the storage medium may include, but is not limited to, various media capable of storing program codes, such as a USB flash drive, a Read-Only Memory (ROM), a Random Access Memory (RAM), a mobile hard disk, a magnetic disk or an optical disk.

Alternatively, specific examples in this embodiment may refer to examples described in the foregoing embodiments and the alternative embodiments, which will be omitted here.

Those ordinarily skilled in the art will appreciate that all or a portion of the above steps may be performed by a program to instruct related hardware (e.g., a processor) to complete, the program may be stored in a computer readable storage medium, such as a read only memory, a disk or an optical disk. Alternatively, all or a portion of the steps of the above embodiments may also be implemented by using one or more integrated circuits. Correspondingly, each module/unit in the above embodiment may be implemented in the form of hardware, for example, its corresponding functions are implemented by an integrated circuit; or may be implemented in the form of a software function module, for example, its corresponding functions are implemented by executing a program instruction stored in a memory by a processor. The present invention is not limited to any specific combination of hardware and software.

It should be noted that the present invention may further have a number of other embodiments. Various corresponding variations and modifications may be made by those skilled in the art according to the present invention without departing from the spirit and scope of the present invention, but these corresponding variations and modifications are intended to fall within the protective scope of the appended claims.

INDUSTRIAL APPLICABILITY

According to a technical solution provided by embodiments of the present invention, a first AP set including at least one AP and detected by a source access point (AP) where a station is located is determined; a target AP to which the station is handed over is selected from the first AP set according to the first AP set and a pre-stored AP set; and a handover message is transmitted to the station. The handover message is configured to indicate a manner of handing over the station from the source AP to the target AP. Since the target AP is in a detection range of the source AP, the target AP may be detected by the station that is in a coverage area of the source AP. The target AP is also in the pre-stored AP set, AP information used for connecting the target AP may be acquired, and the handover message is transmitted to the station by using the AP information to instruct the station to be handed over from the source AP to the target AP. Therefore, a problem that the target access point to which the station is handed over cannot be selected according to the source access point in the related art is solved, and the success rate of the access point handover is improved.

What is claimed is:

1. An access point handover method, comprising:
   determining a first access point (AP) set detected by a source AP where a station is located, wherein the first AP set comprises at least one AP;
   selecting, from the first AP set and according to the first AP set and a pre-stored AP set, a target AP to which the station is to be handed over; and
   transmitting a handover message to the station, wherein the handover message is configured to instruct the station to be handed over from the source AP to the target AP;
   wherein the transmitting the handover message to the station comprises:
   determining whether a duration in which a data transmission rate between the source AP and the station is greater than a preset data transmission rate exceeds a preset duration or not; and
   transmitting the handover message to the station upon a determination that the duration in which the data transmission rate between the source AP and the station is greater than the preset data transmission rate is less than the preset duration.

2. The method according to claim 1, wherein the selecting, from the first AP set and according to the first AP set and the pre-stored AP set, the target AP to which the station is to be handed over comprises:
   searching the pre-stored AP set for APs each of which has a media access control (MAC) address identical to a MAC address of a respective one of the first AP set; and
   acquiring an AP corresponding to a preset connection priority from the found APs as the target AP.

3. The method according to claim 1, wherein the handover message carries a disconnection request, and the disconnection request is configured to request the station to disconnect from the source AP.

4. The method according to claim 3, after transmitting the handover message to the station, the method further comprising:
   receiving a disconnection indication message transmitted by the station in response to the disconnection request;
   disconnecting the station from the source AP when the disconnection indication message indicates accepting the disconnection request; and
   maintaining a connection between the source AP and the station when the disconnection indication message indicates rejecting the disconnection request.

5. The method according to claim 3, before transmitting the handover message to the station, the method further comprising:
   setting a field content of a disconnection request data frame for carrying the disconnection request, wherein the field content comprises a field for indicating that a current request is the disconnection request and a field for indicating an identity of the target AP.

6. The method according to claim 1, after transmitting the handover message to the station, the method further comprising:
  receiving the handover message by the station; and
  handing over the station from the source AP to the target AP according to an indication of the handover message.

7. An access point handover method, comprising:
  receiving a handover message transmitted by a source access point (AP) where a station is located, wherein the handover message is configured to instruct the station to be handed over from the source AP to a target AP, the target AP is selected by the source AP from a first AP set according to the first AP set and a pre-stored AP set, and the first AP set is detected by the source AP and comprises at least one AP; and
  handing over the station from the source AP to the target AP;
  wherein the handover message is transmitted by the source AP to the station upon a determination that a duration in which a data transmission rate between the source AP and the station is greater than a preset data transmission rate is less than a preset duration.

8. The method according to claim 7, wherein the handing over the station from the source AP to the target AP comprises:
  determining whether the target AP is in a second AP set stored in the station; and
  in response to determining that the target AP is in the second AP set stored in the station, handing over the station from the source AP to the target AP.

9. The method according to claim 8, wherein the handover message carries a disconnection request, and the disconnection request is configured to request the station to disconnect from the source AP.

10. The method according to claim 9, after determining whether the target AP is in the second AP set stored in the station, the method further comprising:
  in response to determining that the target AP is in the second AP set stored in the station, transmitting a disconnection indication message that indicates accepting the disconnection request to the source AP, and disconnecting the station from the source AP.

11. A non-transitory computer-readable storage medium storing executable instructions that, when executed by an electronic device, cause the electronic device to:
  receive a handover message transmitted by a source access point (AP) where a station is located, wherein the handover message is configured to instruct the station to be handed over from the source AP to a target AP, the target AP is selected by the source AP from a first AP set according to the first AP set and a pre-stored AP set, and the first AP set is detected by the source AP and comprises at least one AP; and
  hand over the station from the source AP to the target AP;
  wherein the handover message is transmitted by the source AP to the station upon a determination that a duration in which a data transmission rate between the source AP and the station is greater than a preset data transmission rate is less than a preset duration.

12. The non-transitory computer-readable storage medium according to claim 11, wherein the executable instruction further cause the electronic device to:
  determine whether the target AP is in a second AP set stored in the station; and
  in response to determining that the target AP is in the second AP set stored in the station, hand over the station from the source AP to the target AP.

13. The non-transitory computer-readable storage medium according to claim 12, wherein the handover message carries a disconnection request, and the disconnection request is configured to request the station to disconnect from the source AP.

14. The non-transitory computer-readable storage medium according to claim 13, wherein after determining whether the target AP is in the second AP set stored in the station, the executable instruction further cause the electronic device to:
  in response to determining that the target AP is in the second AP set stored in the station, transmit a disconnection indication message that indicates accepting the disconnection request to the source AP, and disconnect the station from the source AP.

* * * * *